United States Patent
Kumagai et al.

(10) Patent No.: US 7,992,440 B2
(45) Date of Patent: Aug. 9, 2011

(54) OPTICAL FIBER VIBRATION SENSOR

(75) Inventors: Tatsuya Kumagai, Hitachi (JP); Wataru Ohnuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 525 days.

(21) Appl. No.: 12/078,807

(22) Filed: Apr. 4, 2008

(65) Prior Publication Data

US 2010/0281985 A1    Nov. 11, 2010

(30) Foreign Application Priority Data

May 16, 2007    (JP) ................................. 2007-130965

(51) Int. Cl.
*G01H 9/00*    (2006.01)
*G01B 9/00*    (2006.01)

(52) U.S. Cl. .......... 73/643; 356/460; 356/465; 356/477; 356/483

(58) Field of Classification Search .................... 73/643; 356/460, 461, 465, 477, 483
See application file for complete search history.

(56) References Cited

U.S. PATENT DOCUMENTS

| | | | |
|---|---|---|---|
| 4,375,680 A * | 3/1983 | Cahill et al. .................... | 367/149 |
| 5,694,114 A * | 12/1997 | Udd .............................. | 340/506 |
| 6,208,590 B1 * | 3/2001 | Kim et al. ..................... | 367/149 |
| 6,456,381 B1 * | 9/2002 | Nakamura et al. ............ | 356/483 |
| 2003/0038946 A1 * | 2/2003 | Takashima et al. ........... | 356/483 |

FOREIGN PATENT DOCUMENTS

| | | | |
|---|---|---|---|
| EP | 0 953 830 A2 * | 3/1999 | |
| JP | 2001041817 A * | 2/2001 | |
| JP | 2001041847 A * | 2/2001 | |
| JP | 2001-194107 | 7/2001 | |
| JP | 2003-247887 | 9/2003 | |
| JP | 2005345349 A * | 12/2005 | |
| JP | 2006208080 A * | 8/2006 | |

OTHER PUBLICATIONS

JPO website computer-generated English translation is attached to the JP-2001-194107 reference.
Chinese Office Action dated Oct. 23, 2009 and English translation thereof.

* cited by examiner

*Primary Examiner* — Hezron Williams
*Assistant Examiner* — Rose M Miller
(74) *Attorney, Agent, or Firm* — McGinn IP Law Group, PLLC

(57) ABSTRACT

An optical fiber vibration sensor includes a light source, an optical receiver, an optical dividing/coupling portion, a signal processing unit, and a fiber loop portion made of an optical fiber. A part of an optical fiber composing the fiber loop portion is installed inside a housing of a main body of the optical fiber vibration sensor as an optical fiber for delay and another part of the optical fiber composing the fiber loop portion is installed outside the housing as a vibration detecting optical fiber.

18 Claims, 7 Drawing Sheets

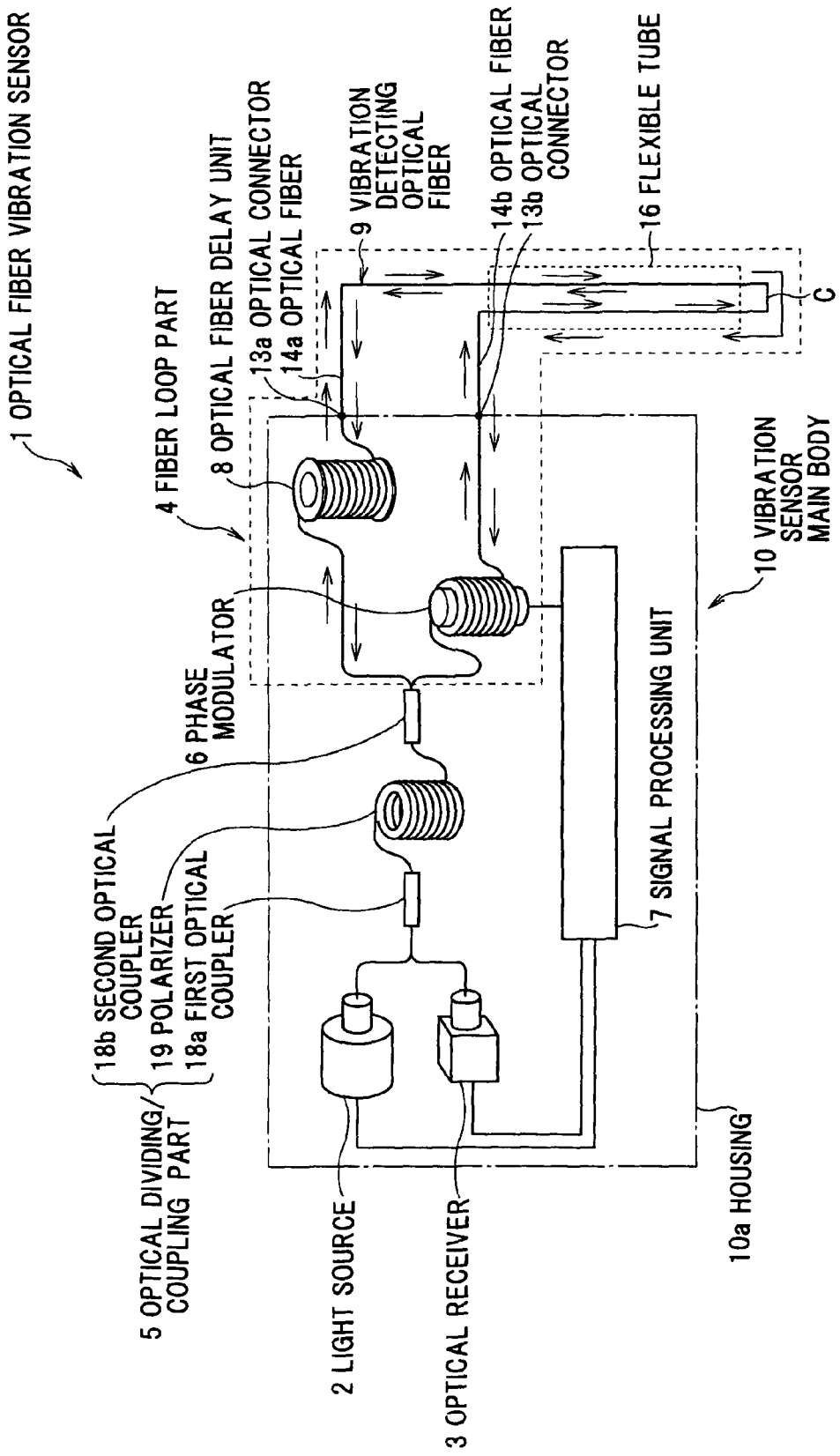

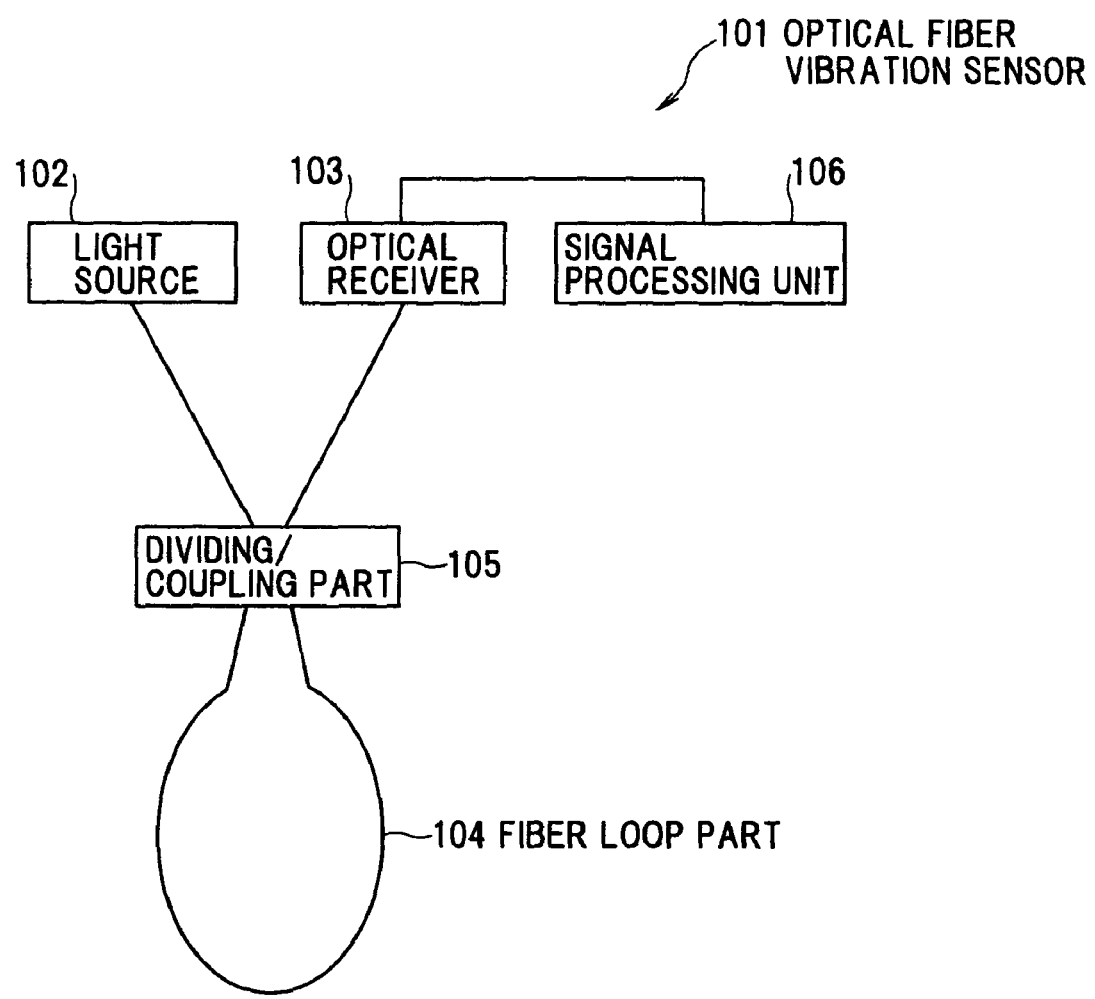

OPTICAL FIBER VIBRATION SENSOR

BACKGROUND OF THE INVENTION

The present application is based on Japanese Patent Application No. 2007-130965, the entire contents of which are incorporated herein by reference.

1. Field of the Invention

The present invention relates to an optical fiber vibration sensor, more particularly, to an optical fiber vibration sensor with excellent detection sensitivity.

2. Related Art

As a conventional sensor for detecting physical external turbulence (vibration, impact) applied to an optical fiber by measuring a variation in an intensity of an interference light generated by an interference of a counter clockwise light and a clockwise light propagated and returned through a looped optical fiber, a Sagnac interference vibration sensor as shown in FIG. 7 has been known.

In FIG. 7, the optical fiber vibration sensor 101 comprises a light source 102, an optical receiver 103, a fiber loop part 104 comprising an optical fiber, an optical dividing/coupling part for inputting signal lights outputted from the light source 102 into the fiber loop part 104 in a counter clockwise direction and a clockwise direction and interfering the signal lights in the counter clockwise direction and the clockwise direction outputted from the fiber loop part 104 to provide an interference light to the optical receiver 103, and a signal processing unit 106 for processing a received signal of the interference light received at the optical receiver 103, in which the optical fiber composing the fiber loop part 104 is installed as an optical fiber for detecting a vibration into a vibration measuring object.

By installing the fiber loop part 104 at a fence, when the fence is vibrated, it is possible to obtain a received light signal similar to that obtained when a rotation angle velocity is generated in the fiber loop part 104. In the Sagnac interference vibration sensor, it is not possible to detect the number of vibration or an absolute value of vibration amplitude. However, it is possible to detect that a specific article hits on the fence, by previously measuring a variation in the received light signal when the specific article hits on the fence to provide a sample for comparison, and comparing the variation in the received light signal that is detected later with the sample for comparison. This system can be applied to detect that a person shook the fence in a restricted zone, a private residence or the like as well as a protective wall for a road or a railway is shaken by a fallen stone. Japanese patent Laid-Open No. 2003-247887 (JP-A-2003-247887) discloses an example of the Sagnac interference vibration sensor.

However, the Sagnac interference vibration sensor disclosed by JP-A-2003-247887 has the sensitivity characteristic that the sensitivity is varied depending on a location in the fiber loop part 104. This phenomenon is caused by that the lights divided in the optical dividing/coupling part 105 and propagated in the counter clockwise direction and the clockwise direction pass at a substantially same time through a part in vicinity of a middle point of the fiber loop part 104 in a loop length direction. In particular, the sensitivity is 0 at the middle point of the fiber loop part. Accordingly, the vibration detecting sensitivity is not uniform depending to the location in the vibration measuring object in which the fiber loop part 104 is installed.

THE SUMMARY OF THE INVENTION

Therefore, it is an object of the invention to provide an optical fiber vibration sensor with the excellent and uniform detection sensitivity, by which the above problem can be solved.

According to a first feature of the invention, an optical fiber vibration sensor comprises:

a light source, an optical receiver, an optical dividing/coupling part, a signal processing unit for processing a signal received from the optical receiver, a fiber loop part for propagating lights divided by the optical dividing/coupling part as a counter clockwise light and a clockwise light, and a housing for accommodating the light source, the optical receiver, the optical dividing/coupling part, the signal processing unit, and a part of the fiber loop part, wherein one end of the optical dividing/coupling part is connected to the light source and the optical receiver, and another end of the optical dividing/coupling part is connected to the fiber loop part, wherein the optical dividing/coupling part comprises a first optical coupler to which the light source and the optical receiver are connected, a polarizer for polarizing a light output from the first optical coupler, a second optical coupler for dividing the light output from the polarizer to be inputted into the fiber loop part and coupling the light output from the fiber loop part, wherein the fiber loop part comprises a phase modulator, and wherein a part of an optical fiber composing the fiber loop part is provided in the housing as an optical fiber for delay while another part of the optical fiber composing the fiber loop part is installed outside the housing as a vibration detecting optical fiber.

Preferably, the optical fiber for delay has at least a half length of the optical fiber composing the fiber loop part.

Preferably, the vibration detecting optical fiber comprises two optical fibers arranged in parallel that are connected directly to each other or via an optical fiber for folding.

Preferably, the vibration detecting optical fiber comprises a folded part of the fiber loop part installed outside the housing and a flexible tube for accommodating the folded part of the fiber loop part.

Preferably, the vibration detecting optical fiber is freely detachable from and attachable to the housing.

Preferably, the optical fiber used in the light source, the optical receiver, and the optical dividing/coupling part and the optical fiber composing the fiber loop part are polarization-maintaining optical fibers.

According to a second feature of the invention, an optical fiber vibration sensor comprises:

a light source;

an optical receiver;

an fiber loop part comprising an optical fiber with a loop structure for propagating a counter clockwise light and a clockwise light;

an optical dividing/coupling unit connected to the light source and the optical receiver at one end and connected to the fiber loop part at another end, for dividing a light output from the light source to be input to the fiber loop part and coupling lights output from the fiber loop part to be input to the optical receiver; and a phase modulator for imparting a phase difference between the counter clockwise light and the clockwise light, wherein a part of the fiber loop part constitutes a sensor cable to be installed in a measuring object, and wherein at least a half part of the fiber loop part is provided outside the sensor cable.

Preferably, the sensor cable comprises two optical fiber parts arranged in parallel.

Preferably, a part of the half part of the fiber loop part constitutes an optical fiber delay unit.

Preferably, the optical dividing/coupling unit comprises a polarizer.

Preferably, the two optical fiber parts are formed by folding a single optical fiber.

EFFECT OF THE INVENTION

According to the present invention, it is possible to provide an optical fiber vibration sensor with the excellent and uniform detection sensitivity.

BRIEF DESCRIPTION OF THE DRAWINGS

Next, the present invention will be explained in more detail in conjunction with appended drawings, wherein:

FIG. 1 is a schematic diagram showing a configuration of an optical fiber vibration sensor in a preferred embodiment;

FIG. 7 is a block diagram of a conventional optical fiber vibration sensor.

DESCRIPTION OF THE PREFERRED EMBODIMENT

Figure 2A:
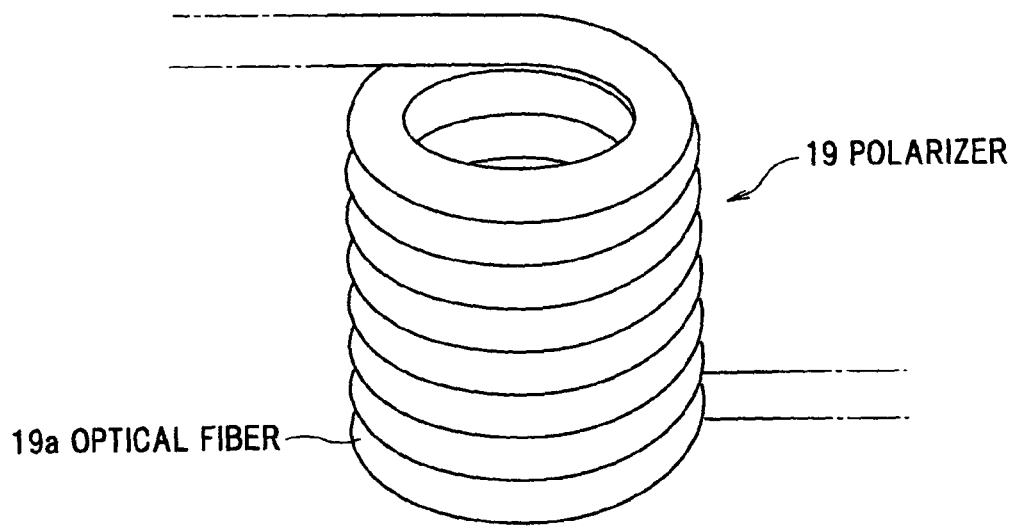
FIG. 2A is a perspective view of a polarizer.

Next, a preferred embodiment of the present invention will be explained in more detail in conjunction with appended drawings.

(Structure of Optical Fiber Vibration Sensor 1)

As shown in FIGS. 1, 2A-2B, 3A-3B, and 4, an optical fiber vibration sensor 1 in the preferred embodiment according to the present invention comprises a vibration sensor main body 10 including a housing 10a, and a vibration detecting optical fiber 9 installed outside the housing 10a of the vibration sensor main body 10.

As shown in FIG. 1, the vibration sensor main body 10 comprises a light source 2, an optical receiver 3, an optical dividing/coupling part 5 for dividing or coupling a light, a signal processing unit 7 for processing a signal received from the optical receiver 3, a housing 10a, and a vibration detecting optical fiber 9, a part of which is installed outside the housing 10a as a fiber loop part (optical closed circuit) 4.

The fiber loop part 4 comprises a phase modulator 6, and an optical fiber delay unit 8 in the housing 10a. The optical fiber delay unit 8 comprises an optical fiber 8b having at least a half length of the fiber loop part 4. Detailed structure of each part will be explained later.

As the light source 2, a laser diode (LD) or a super luminescent diode (SLD) having a short coherence length is used. As the optical receiver 3, a photodiode (PD) is used. A connecting optical fiber is connected to each of the light source 2 and the optical receiver 3 to be connected to the optical dividing/coupling part 5 as described below.

The optical dividing/coupling part 5 comprises a first optical coupler 18a connected to the light source 2 and the optical receiver 3, a second optical coupler 18b connected to the fiber loop part 4 to be described below, and a polarizer 19 connected between the first optical coupler 18a and the second optical coupler 18b.

As shown in FIGS. 1 and 2A, the polarizer 19 is a fiber type polarizer manufactured by forming a part of an optical fiber 19a which connects the first optical coupler 18a with the second optical coupler 18b to have a coil shape, in which a birefringence of a core is increased.

As indicated by a broken line in FIG. 1, the fiber loop part 4 comprises an optical fiber connected to the second optical coupler 18b composing the optical dividing/coupling part 5, in which optical paths are formed such that lights divided by the second optical coupler 18b are circulated (propagated) respectively in a counter clockwise direction and a clockwise direction.

Since an interference light intensity of the lights circulated through the fiber loop part 4 in the counter clockwise direction and the clockwise direction (hereinafter, referred as "counter clockwise light" and "clockwise light" respectively) is proportional to cos φ (φ: Sagnac phase difference), a detection sensitivity with respect to a subtle phase difference is deteriorated. Therefore, in order to improve the detection sensitivity with respect to the subtle phase difference, the phase modulator 6 for generating a phase difference of π/2 between the counter clockwise light and the clockwise light.

The phase modulator 6 is installed in the fiber loop part 4 for providing a phase modulation with a relative time delay with each of the counter clockwise light and the clockwise light.

Figure 2B:
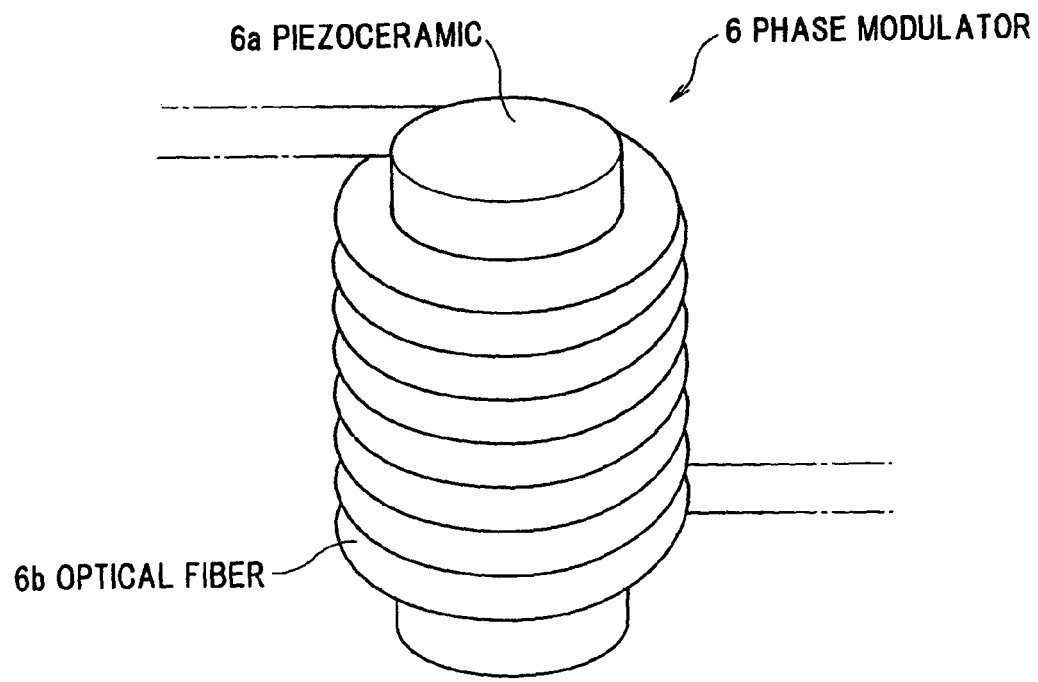
FIG. 2B is a perspective view of a phase modulator.

In this preferred embodiment, as shown in FIG. 2B, the phase modulator 6 comprises a cylindrical piezoceramic (PZT) 6a, and an optical fiber 6b composing a part of the fiber loop part 4 that is wound around the cylindrical PZT 6a, for modulating a phase of the propagated light by expanding and contracting the optical fiber 6b wound around the cylindrical PZT 6a by applying a voltage to the cylindrical PZT 6a.

The signal processing unit 7 determines a location that the vibration is generated, a magnitude of the vibration, or the like by processing the received signal output from the optical receiver 3. The signal processing unit 7 also controls an output level of the light source 2 and a modulation level of the phase modulator 6.

Figure 3A:
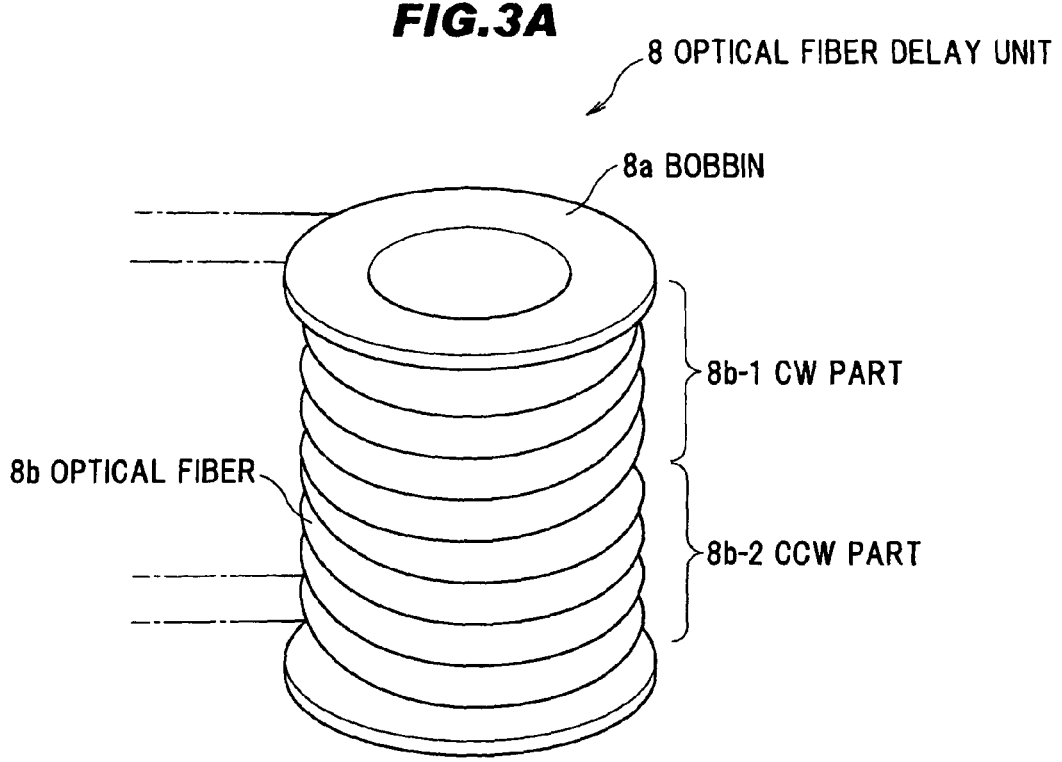
FIG. 3A is a perspective view of an optical fiber delay unit.
Figure 3B:
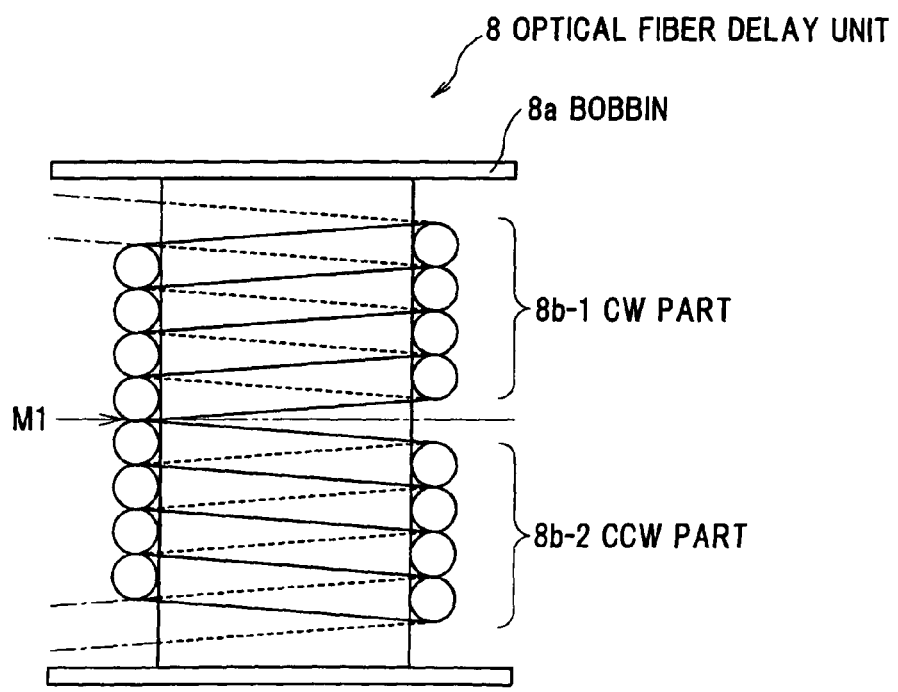
FIG. 3B is an explanatory diagram showing a side view of the optical fiber delay unit.

As shown in FIGS. 3A and 3B, the optical fiber delay unit 8 comprises a bobbin 8a, and an optical fiber 8b with a predetermined entire length that is would around the bobbin 8a to be centralized in one place. In this preferred embodiment, the optical fiber 8b has a length corresponding to a half or more of an optical path length of the fiber loop part 4. The optical fiber 8b of the optical fiber delay unit 8 comprises a part 8b-1 wound in one direction (i.e. a clockwise direction) and a part 8b-2 wound in an opposite direction (i.e. a counter clockwise direction). The part 8b-1 wound in the clockwise direction (hereinafter referred as "CW part") and the part 8b-2 wound in the counter clockwise direction (hereinafter referred as "CCW part") have the same fiber lengths and the same winding numbers, so that cross sections of the CW part 8b-1 and the CCW part 8b-2 of the optical fiber 8b wound in the opposite directions are equal to each other. For example, a middle point M of the optical fiber 8b of the fiber loop part 4 composing the optical fiber delay unit 8 is determined appropriately, and one side part and an opposite side part folded at the middle point M are arranged in parallel and wound around the bobbin 8a.

According to this structure, even when an impact or a vibration is applied to the vibration sensor main body 10 (namely, the housing 10a), or the vibration sensor main body 10 is rotated, the optical fiber delay unit 8 accommodated in the housing 10a does not detect a rotation movement and a malfunction in detecting the vibration does not occur.

Figure 4:
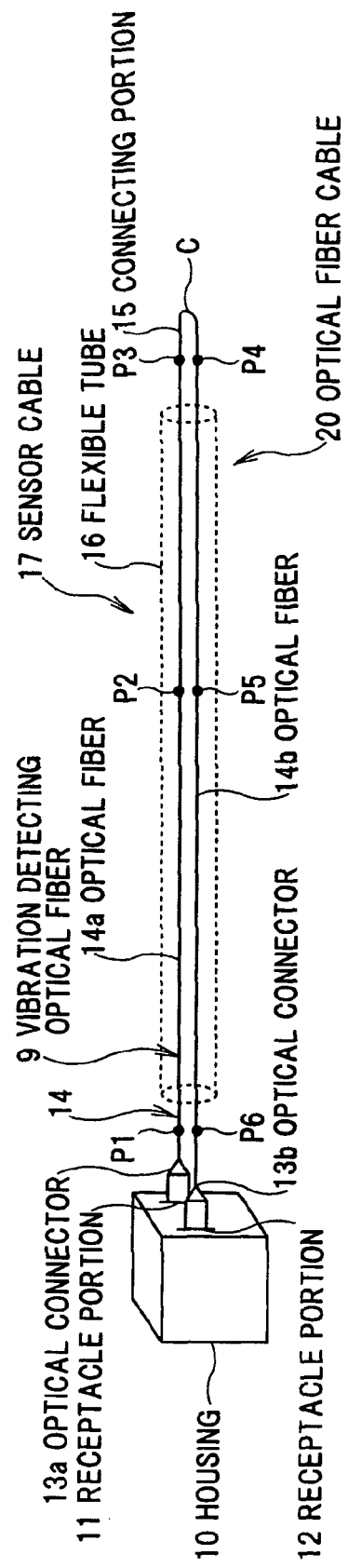
FIG. 4 is a stereogram of the optical fiber vibration sensor shown in FIG. 1.

On the other hand, the vibration detecting optical fiber 9 is installed in a vibration sensing object, and preferably construed as shown in FIG. 4.

The optical fiber vibration sensor 1 as shown in FIG. 1 is different in structure from the conventional device a follows. In the conventional device, an entire length of the fiber loop part 104 is installed in the vibration sensing object. On the other hand, in the optical fiber vibration sensor 1 as shown in FIG. 1, the fiber loop part 4 comprises the optical fiber 8b of the optical fiber delay unit 8 that is not installed in the vibration sensing object and the vibration detecting optical fiber 9 to be installed in the vibration sensing object.

It is preferable that the optical fiber used in the light source 2, the optical receiver 3, and the optical dividing/coupling part 5 and the optical fiber composing the fiber loop part 4 are polarization-maintaining fibers.

As shown in FIGS. 1 and 4, the vibration detecting optical fiber 9 is installed outside of the housing 10a of the vibration sensor main body 10. In this preferred embodiment, the vibration detecting optical fiber 9 is construed to be freely detachable from and attachable to the vibration sensor main body 10. In other words, the fiber loop part 4 comprises an optical fiber composing the phase modulator 6, the optical fiber delay unit 8 and the like to be installed in the vibration sensor main body 10, and the vibration detecting optical fiber 9 installed outside the vibration sensor main body 10. The optical fiber composing a part of the fiber loop part 4 in the vibration sensor main body 10 is connected to the vibration detecting optical fiber 9 composing another part of the fiber loop part 4 installed outside the vibration sensor main body 10 via receptacle portions 11, 12 provided at an outer surface of the housing 10a of the vibration sensor main body 10.

As shown in FIG. 4, in the vibration sensor main body 10, the receptacle portions 11, 12 are provided at the outer surface of the housing 10a, and are connected respectively to optical connectors 13a, 13b provided at both ends of the vibration detecting optical fiber 9. According to this structure, the optical fiber composing the part of the fiber loop part 4 in the vibration sensor main body 10 is connected to the vibration detecting optical fiber 9 composing another part of the fiber loop part 4 installed outside the vibration sensor main body 10, to provide the fiber loop part 4. By providing the vibration detecting optical fiber 9 to be freely detachable from and attachable to the vibration sensor main body 10, it is possible to install the vibration detecting optical fiber 9 in a fence or the like.

The vibration detecting optical fiber 9 comprises two optical fibers 14a, 14b arranged in parallel, and a connecting portion 15 for connecting the two optical fibers 14a, 14b at one ends of the optical fibers 14a, 14b. The two optical fibers 14a, 14b are accommodated in a flexible tube 16.

Herein, a total of the vibration detecting optical fiber 9 and the flexible tube 16 is referred as a sensor cable 17. The sensor cable 17 comprises the optical fiber 14a, 14b composing parts of the fiber loop part 4 that are disposed in parallel for advancing and returning lights, and the flexible tube 16 for bundling the optical fibers 14a, 14b into one, and the sensor cable 17 is construed to be freely detachable from and attachable to the vibration sensor main body 10. By installing the sensor cable 17 in the vibration sensing object and mounting the sensor cable 17 on the vibration sensor main body 10, it is possible to detect the vibration. For example, when the vibration detecting optical fiber 9 is installed in a chain-link fence, the sensor cable 17 is fastened to the wire gauze by means of a fastener made of a resin.

In this preferred embodiment, the vibration detecting optical fiber 9 is construed by using an optical fiber cable comprising the two optical fibers 14a, 14b in the flexible tube 16. The connecting portion 15 is formed by removing an optical fiber coating at a tip portion of the optical fiber cable by a predetermined length (for example, 10 mm) to expose the two optical fibers 14a, 14b, and connecting exposed portions of the two optical fibers 14a, 14b, finally recoating a connected portion. Thereafter, the partially removed two optical fibers 14a, 14b including the connecting portion 15 are accommodated in an optical fiber casing (not shown) within a limit of an allowable bending diameter.

The optical fiber casing comprises a resin or a metal. The connecting portion 15 and the removed two optical fibers 14a, 14b are fixed to the optical fiber casing to by potting of the resin. The vibration detecting optical fiber 9 may be provided by folding a single optical fiber. However, with considering handling workability for fixing the cable to the fence or the like, it is preferable to connect the two optical fibers by using the optical fiber cable having the two optical fibers to provide the vibration detecting optical fiber 9.

(Operation of the Optical Fiber Vibration Sensor 1)

Next, an operation of the optical fiber vibration sensor 1 will be explained below.

The optical fiber vibration sensor 1 is one of the Sagnac interference type vibration sensors. When a vibration is applied to an optical fiber 14 (namely, the optical fiber 14a or 14b) composing the fiber loop part 4, an intensity of an optical signal detected by the optical receiver 3 is changed.

Herein, when a vibration frequency of the vibration applied to the optical fiber 14 is fm, a propagation delay time difference between the counter clockwise light and the clockwise light at a position where the vibration is applied (a positioning a longitudinal direction of the optical fiber 14) is τ, and a phase difference between the counter clockwise light and the clockwise light is φ, the phase difference cp as a function of a time t is established by a following formula (I):

$$\phi(t) = A \cdot \sin(2\pi \cdot fm \cdot \tau/2) \cdot \cos(2\pi \cdot fm \cdot t) \quad (1)$$

where A is a constant of an intensity (amplitude) of the vibration.

At a middle point M of the fiber loop part 4, the propagation delay time difference τ=0 is established, since the counter clockwise light and the clockwise light arrive at the same time. At this time, even if the vibration is applied to the optical fiber 14, the phase difference φ=0 is established from the formula (I). In other words, at the middle point M of the fiber loop part 4, the sensitivity with respect to the vibration is 0.

Since the propagation delay time difference r has a specific value other than 0 at a position distant from the middle point M of the fiber loop part 4, the phase difference φ has a specific value other than 0 when the vibration is applied to the optical fiber 14. The propagation delay time difference τ is increased in accordance with a distance from the middle point M, so that the phase difference φ with respect to the vibration having the same intensity is increased. In other words, the sensitivity for the vibration is increased in accordance with an increase in the distance from the middle point M. In addition, the propagation delay time difference τ is a very small value. Therefore, a sine function in the formula (1) can be approximated by a linear expression.

In concrete, when the entire length of the fiber loop part 4 is 400 m, a maximum value of the propagation delay time difference τ is calculated from a refractive index n of an optical fiber core and a light velocity c as follows:

$$\tau = L \cdot n \cdot c$$
$$= (400 \times 1.47 / (3 \times 10^8))$$
$$= 1.96 \times 10^{-6}$$

At this time, when the maximum value of the vibration frequency fm is 100 Hz, the value of (fm·τ) is about $2 \times 10^{-4}$ that is extremely small. Therefore, the sine function of the formula (1) can be approximated by the linear expression. Therefore, the phase difference φ is proportional to the propagation delay time difference τ. In other words, the sensitivity of the Sagnac interference type vibration sensor is proportional to the propagation delay time difference τ.

As described above, the Sagnac interference type vibration sensor has the sensitivity characteristics in which the sensitivity is varied in accordance with the positions in the fiber loop part 4.

Figure 5:
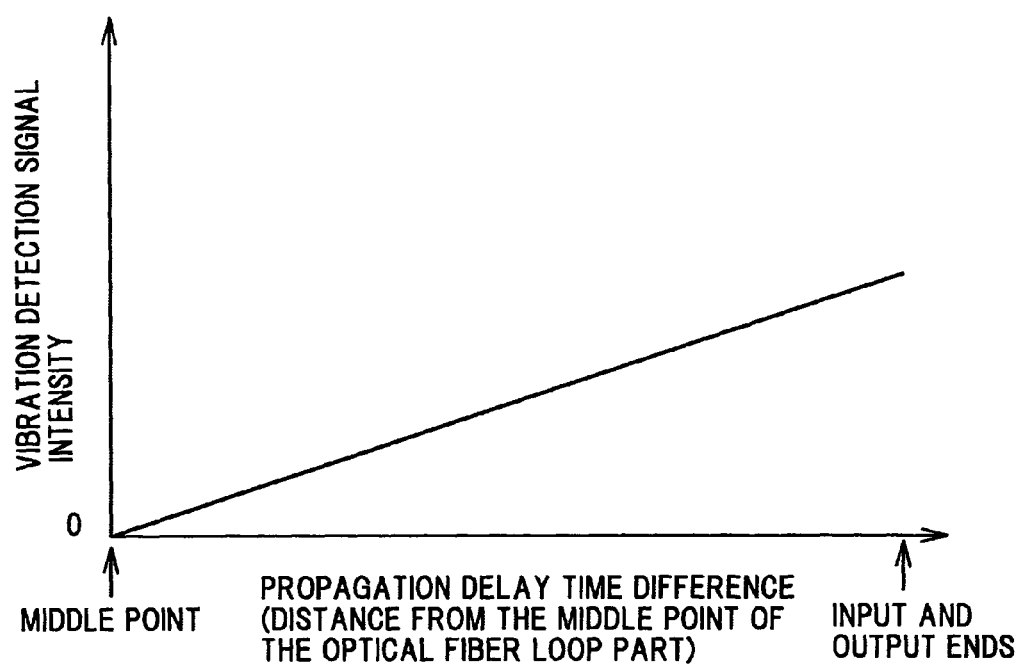
FIG. 5 is a sensitivity characteristic diagram of a fiber loop part in a Sagnac interference type vibration.

FIG. 5 is a sensitivity characteristic diagram in which the propagation delay time difference τ is shown in a horizontal scale and the vibration detection signal intensity based on the phase difference φ is shown in a vertical scale. As shown in FIG. 5, the vibration detection signal intensity is proportional to the propagation delay time difference τ. Since the propagation delay time difference τ is a function of a distance from the middle point M of the fiber loop part 4, it is possible to provide the sensitivity characteristic diagram of the fiber loop part 4 by showing the position in the fiber loop part 4 in the horizontal scale.

Therefore, according to the conventional optical fiber vibration sensor in which the whole fiber loop part 104 is installed in the vibration sensing object, the sensitivity for detecting the vibration is non-uniform in accordance with the positions in the fiber loop part 104 installed in the vibration sensing object. In concrete, the sensitivity is 0 in the middle point of the fiber loop part 104, and the sensitivity in vicinity of the middle point is very small. The sensitivity is increased in accordance with the distance from the middle point, and the sensitivity is at maximum at input and output ends (in just proximity of optical fiber couplers) of the fiber loop part 104.

In the optical fiber vibration sensor 1 of the present invention, the delay detecting optical fiber 8 has the length corresponding to a half or more of the entire length of the optical fiber composing the fiber loop part 4, so that it is possible to provide the middle point M of the fiber loop part 4 at the receptacle portion 11 that is a connecting point between the one end of the vibration detecting optical fiber 9 and the housing 10a. By connecting another end of the vibration detecting optical fiber 9 to the receptacle portion 12, it is possible to provide a structure in which the sensitivity from one end to another end is increased from 0 in proportion to a distance from one end of the vibration detecting optical fiber 9. Further, the sensitivity at the connecting portion 15 including a center (turning point) C of the vibration detecting optical fiber 9 has an intermediate value between the sensitivity in vicinity of the receptacle portion 11 and the sensitivity in vicinity of the receptacle portion 12.

According to the present invention, the vibration detecting optical fiber 9 installed outside the housing 10a is accommodated in a single flexible tube 16 to provide the sensor cable 17, so that sensitivity distributions of the optical fibers 14a, 14b that are positioned in parallel for advancing and returning lights are overlapped, thereby providing a uniform sensitivity regardless the position in the longitudinal direction of the sensor cable 17.

Figure 6A:
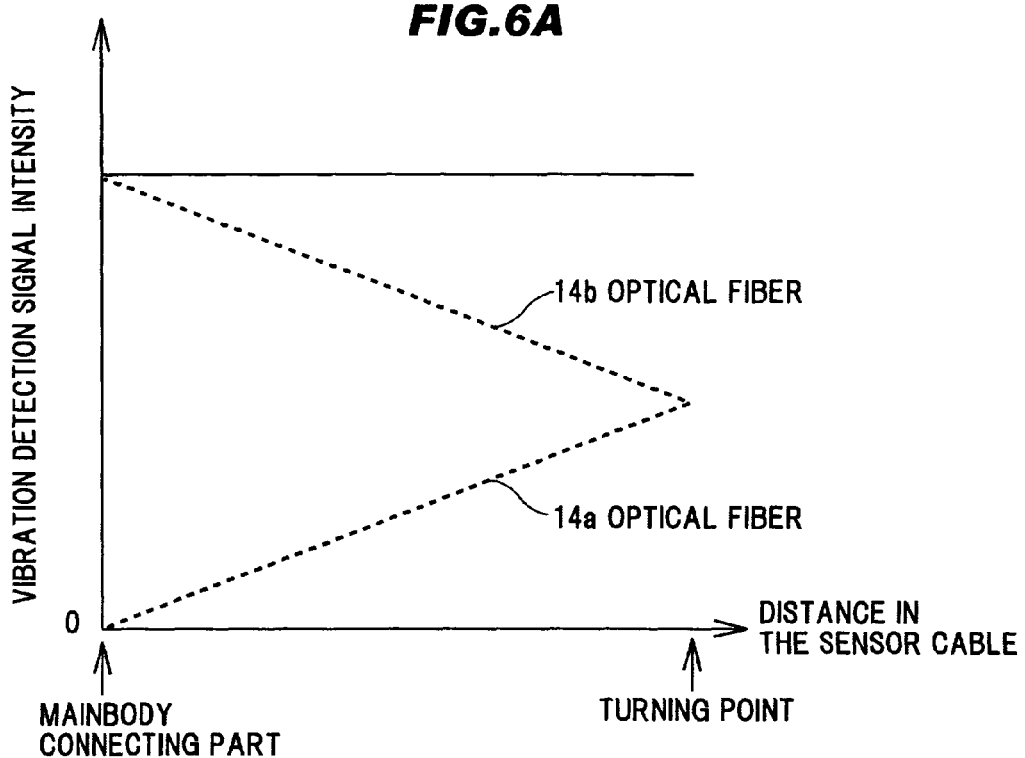
FIG. 6A is a sensitivity characteristic diagram of a sensor cable (vibration detecting optical fiber) in the preferred embodiment according to the present invention.

FIG. 6A is a sensitivity characteristic diagram in which a distance from a connecting point with the vibration sensor main body 10 to a turning point C in the sensor cable 17 is shown in a horizontal scale and the vibration detection signal intensity based on the phase difference φ is shown in a vertical scale. As indicated by a solid line in FIG. 6A, the sensitivity of the sensor cable 17 according to the present invention is constant in the longitudinal direction. As indicated by broken lines, the sensitivities of the two optical fibers 14a, 14b are superimposed to provide a constant value.

Table 1 shows a clockwise direction distance and counter clockwise direction distance at respective measuring points P1 to P6 in the fiber loop part 4 shown in FIG. 4, where the entire length of the fiber loop part 4 is 4 L. Herein, an optical fiber composing other parts than the optical fiber delay unit 8 and the vibration detecting optical fiber 9 is assumed to be so shorter than the optical fiber 8b of the optical fiber delay unit 8 and the vibration detecting optical fiber 9 that the length of the other optical fiber can be ignored. For example, the entire length of the fiber loop part 4 is 400 m while a length of the optical fiber 6b of the phase modulator 6 is 1 m.

TABLE 1

| Measuring point | Clockwise direction distance | Counter clockwise direction distance | Difference |
|---|---|---|---|
| P1 | 2L | 2L | 0 |
| P2 | 2L + x | 2L − x | 2x |
| P3 | 3L | L | 2L |
| P4 | 3L | L | 2L |
| P5 | 4L − x | x | 4L − 2x |
| P6 | 4L | 0 | 4L |

In Table 1, x is a distance between the vibration sensor main body 10 and the measuring point in the sensor cable 17. As shown in Table 1, the counter clockwise distance and the clockwise distance at the measuring point P1 connected to the receptacle portion 11 are (2 L, 2 L). The counter clockwise distance and the clockwise distance at the measuring point P6 connected to the receptacle portion 12 are (4 L, 0). Herein, the length of the optical fiber 8b of the optical fiber delay unit 8 is 2 L, and the length of the vibration detecting optical fiber 9 is 2 L. At the measuring points P2 and P5 in which the distance of the measuring point from the vibration sensor main body 10 is x, the counter clockwise distance and the clockwise distance at the measuring points P2 and P5 are (2 L+x, 2 L−x) and (4 L−x, x).

The difference between the clockwise direction distance and the counter clockwise direction distance (referred as "distance" in Table 1) at the respective measuring points P1 to P6 in FIG. 4 are 0 and 4 L (P1 and P6), 2x and 4 L-2x (P2 and P5), and 2 L and 2 L (P3 and P4). The propagation delay time difference τ is proportional to the difference between the clockwise direction distance and the counter clockwise direction distance, and the sensitivity is proportional to the propagation delay time difference τ, so that the difference shown in Table 1 can be considered as the sensitivity. The total of the sensitivities of the optical fibers 14a, 14b for the counter clockwise light and the clockwise light in the vibration detecting optical fiber 9 is 4 L for any location. This sensitivity characteristics coincides with the sensitivity characteristics shown in FIG. 6A.

Namely, in the optical fiber vibration sensor 1 in this preferred embodiment, even when the vibration occurs at an arbitrary point in the sensor cable 17, it is possible to detect the vibration with the constant sensitivity.

In the above preferred embodiment, the length of the optical fiber 8b of the optical fiber delay unit 8 is 2 L, and the length of the vibration detecting optical fiber 9 is 2 L, so that the optical fiber 8b of the optical fiber delay unit 8 corresponds to a half of the length of the fiber loop part 4.

However, the present invention is not limited thereto, and similar effect can be obtained when the length of the optical fiber 8b of the optical fiber delay unit 8 is not less than a half of the length of the fiber loop part 4. When the length of the optical fiber 8b of the optical fiber delay unit 8 is greater than a half of the length of the fiber loop part 4, the vibration detection signal intensity at the main body connecting point shown in FIG. 6A (for example, P1, P6 shown in FIG. 4) is greater than 0, so that the graphs of the sensitivities of the optical fibers 14a, 14b and the total sensitivity are shifted upwards. As a result, the sensitivity (vibration detection signal intensity) is uniform regardless the measuring point.

Figure 6B:
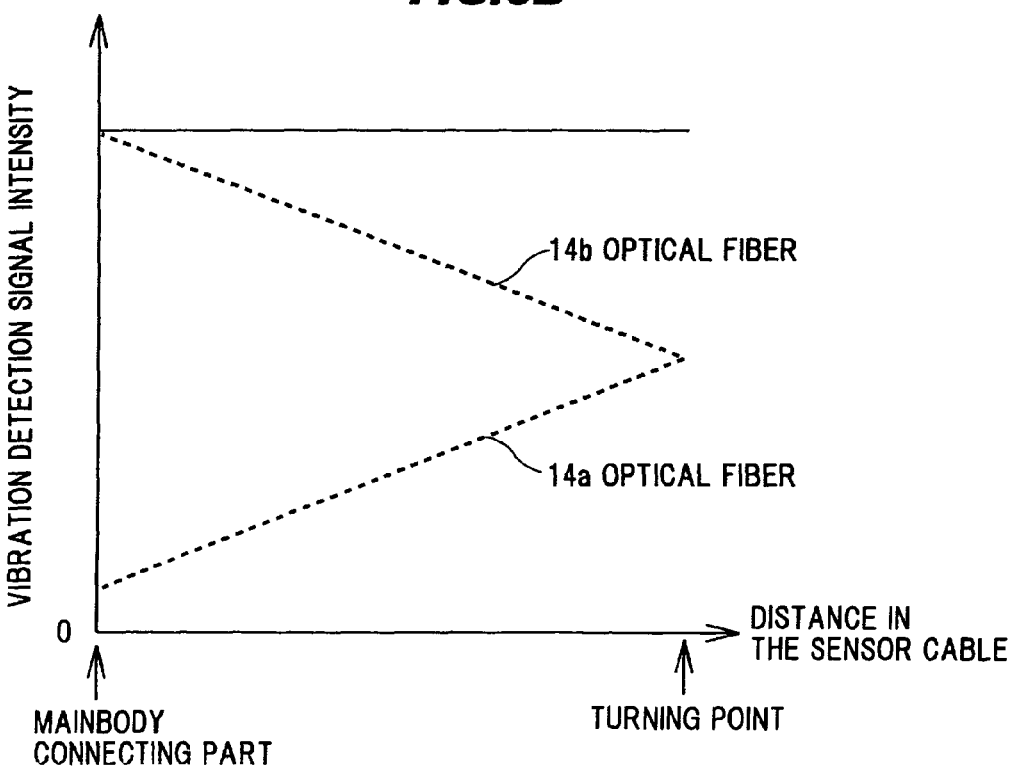
FIG. 6B is another sensitivity characteristic diagram of a sensor cable (vibration detecting optical fiber) in the preferred embodiment according to the present invention.

FIG. 6B is another sensitivity characteristic diagram in which a distance from a connecting part with the vibration sensor main body 10 to a turning point C in the sensor cable 17 is shown in a horizontal scale and the vibration detection signal intensity based on the phase difference φ is shown in a vertical scale, when the length of the optical fiber 8b of the optical fiber delay unit 8 is greater than a half of the length of the fiber loop part 4. As shown in FIG. 6B, the total of the sensitivities is greatly improved.

Further, in this preferred embodiment, the entire length of the optical fiber 14 to be installed outside the housing 10a of the vibration sensor main body 10 as the vibration detecting optical fiber 9 is installed in the fence that was the object to be measured. However, for sensing the vibration of the object to be measured that is located at a place distant from the housing 10a of the optical fiber vibration sensor 1, it is not necessary to use a part of the optical fiber 14 provided at a side of the housing 10a as the vibration detecting optical fiber 9. Therefore, the length of the optical fiber 8b of the optical fiber delay unit 8 may be equal to or less than a half of the entire length of the fiber loop part 4, in the case that the middle point M of the fiber loop part 4 exists in the other part of the optical fiber 14 than the vibration detecting optical fiber 9.

In other words, when a part of the fiber loop part 4 constitutes the sensor cable 17 to be installed in the measuring object, if at least a half part of the fiber loop part 4 is provided outside the sensor cable 17, it is possible to improve the vibration detecting sensitivity of the optical fiber vibration sensor 1. Further, by providing the vibration detecting optical fiber 9 comprising the optical fiber 14a, 14b arranged in parallel as the sensor cable 17, it is possible to realize the uniform vibration detecting sensitivity of the optical fiber vibration sensor 1.

In this preferred embodiment, the phase modulator 6 is formed by using the optical fiber 6b that is a part of the optical fiber composing the fiber loop part 4, in order to construe an open loop type optical fiber vibration sensor for modulating the phase of the propagated light by applying a sinusoidal voltage with a predetermined frequency. However, the present invention is not limited thereto, and it is also possible to construe a closed loop type optical fiber vibration sensor, in which the detected phase of the propagated light is fed back to the phase modulator.

In this preferred embodiment, a double coupler system using the first optical coupler 18a and the second optical coupler 18b connected to the optical dividing/coupling part 5 is adopted. However, the present invention is not limited thereto. It is also possible to use a single coupler system using an optical coupler having two ports at both ends, in which the light source 2 and the optical receiver 3 are connected to one end and the input and output ends of the fiber loop part 4 are connected to another end. Further, the polarizer 19 provided at the optical dividing/coupling part 5 may be omitted.

Although the invention has been described, the invention according to claims is not to be limited by the above-mentioned embodiments. Furthermore, please note that not all combinations of the features described in the embodiment are not necessary to solve the problem of the invention.

What is claimed is:

1. An optical fiber vibration sensor, comprising:
a light source, an optical receiver, an optical dividing/coupling unit, a signal processing unit for processing a signal received from the optical receiver, a fiber loop portion for propagating lights divided by the optical dividing/coupling unit as a counter clockwise light and a clockwise light, and a housing for accommodating the light source, the optical receiver, the optical dividing/coupling unit, the signal processing unit, and a part of the fiber loop portion,
wherein one end of the optical dividing/coupling unit is connected to the light source and the optical receiver, and another end of the optical dividing/coupling unit is connected to the fiber loop portion,
wherein the optical dividing/coupling unit comprises a first optical coupler to which the light source and the optical receiver are connected, a polarizer for polarizing a light output from the first optical coupler, a second optical coupler for dividing the light output from the polarizer to be inputted into the fiber loop portion and coupling the light output from the fiber loop portion,
wherein the fiber loop portion comprises a phase modulator,
wherein a part of an optical fiber composing the fiber loop portion is provided in the housing as an optical fiber for delay, while another part of the optical fiber composing the fiber loop portion is installed outside the housing as a vibration detecting optical fiber,
wherein the vibration detecting optical fiber comprises two parallel portions of the fiber loop portion, which are accommodated in a single flexible tube,
wherein the fiber loop portion is folded to provide the two parallel portions of the fiber loop portion to provide a uniform sensitivity to detect vibration along a longitudinal direction, and
wherein a middle point of the optical fiber that forms the optical fiber loop portion is located outside the flexible tube.

2. The optical fiber vibration sensor according to claim 1, wherein the optical fiber for delay has at least a half length of the optical fiber composing the fiber loop portion.

3. The optical fiber vibration sensor according to claim 1, wherein the vibration detecting optical fiber comprises two optical fibers arranged in parallel that are connected directly to each other or via an optical fiber for folding.

4. The optical fiber vibration sensor according to claim 1, wherein, the vibration detecting optical fiber is freely detachable from and attachable to the housing.

5. The optical fiber vibration sensor according to claim 1, wherein the optical fiber used in the light source, the optical receiver, and the optical dividing/coupling unit and the optical fiber composing the fiber loop portion are polarization-maintaining optical fibers.

6. The optical fiber vibration sensor according to claim 1, wherein the optical fiber of the optical fiber for delay comprises a part wound in one direction and a part wound in an opposite direction, and the part wound in the one direction and the part wound in the opposite direction have a same fiber length and a same winding number, so that cross sections of the part wound in the one direction and the part wound in the opposite direction of the optical fiber wound in the opposite directions are equal to each other.

7. The optical fiber vibration sensor according to claim 1, wherein the two parallel portions of the fiber loop portion have a same length.

8. The optical fiber vibration sensor according to claim 1, wherein the two parallel portions of the fiber loop portion are formed by folding the fiber loop portion at a predetermined point.

9. The optical fiber vibration sensor according to claim 8, wherein the middle point of the optical fiber forming the fiber loop portion is different from the predetermined point.

10. An optical fiber vibration sensor, comprising:
a light source;
an optical receiver;
an fiber loop portion comprising an optical fiber with a loop structure for propagating a counter clockwise light and a clockwise light;
an optical dividing/coupling unit connected to the light source and the optical receiver at one end and connected to the fiber loop portion at another end, for dividing a light output from the light source to be input to the fiber loop portion and coupling lights output from the fiber loop portion to be input to the optical receiver;
a phase modulator for imparting a phase difference between the counter clockwise light and the clockwise light; and
a vibration detecting optical fiber comprising two parallel portions of the fiber loop portion, which are accommodated in a single flexible tube,
wherein the fiber loop portion is folded to provide the two parallel portions of the fiber loon portion to provide a uniform sensitivity to detect vibration along a longitudinal direction, and
wherein a middle point of the optical fiber that forms the optical fiber loop portion is located outside the flexible tube.

11. The optical fiber vibration sensor according to claim 10, wherein the vibration detecting optical fiber comprising the fiber loop portion comprises two optical fibers having an equal length arranged in parallel.

12. The optical fiber vibration sensor according to claim 10, wherein a half of the fiber loop portion partially comprises an optical fiber delay unit.

13. The optical fiber vibration sensor according to claim 10, wherein the optical dividing/coupling unit comprises a polarizer.

14. The optical fiber vibration sensor according to claim 10, wherein the vibration detecting optical fiber comprising the fiber loop portion is formed by folding a center point of a single optical fiber.

15. The optical fiber vibration sensor according to claim 12, wherein the optical fiber of the optical fiber for delay comprises a part wound in one direction and a part wound in an opposite direction, and the part wound in the one direction and the part wound in the opposite direction have a same fiber length and a same winding number, so that cross sections of the part wound in the one direction and the part wound in the opposite direction of the optical fiber wound in the opposite directions are equal to each other.

16. The optical fiber vibration sensor according to claim 10, wherein the two parallel portions of the fiber loop portion have a same length.

17. The optical fiber vibration sensor according to claim 10, wherein the two parallel portions of the fiber loop portion are formed by folding the fiber loop portion at a predetermined point.

18. The optical fiber vibration sensor according to claim 17, wherein the middle point of the optical fiber forming the fiber loop portion is different from the predetermined point.

* * * * *